Patented May 22, 1928.

1,671,003

UNITED STATES PATENT OFFICE.

AHARON BAGHDASAR BAGHDASARIAN, NOW BY JUDICIAL CHANGE OF NAME AARON BYSAR BAGSAR, OF HUNTINGTON, WEST VIRGINIA.

PROCESS FOR EXTRACTING METALS FROM METALLIC SULPHIDES.

No Drawing. Application filed August 17, 1925. Serial No. 50,833.

This invention is an improvement in processes for extracting metals from metallic sulphides, and has for its object to provide a cyclic process by means of which sulphide ores, concentrates, middling products, mattes, speisses, and other metallic sulphide bearing materials can be treated and the metals extracted therefrom in an economical and commercially practicable manner.

My process comprises subjecting the material to be treated to the action of chlorine gas, at elevated temperatures; separating the valuable metals from the gangue by volatilizing the metals as chlorides, simultaneously with the chlorination; reducing by hydrogen gas, at elevated temperatures, the metallic chlorides produced, by which reduction metals and gaseous hydrogen chloride are produced; separating the gaseous hydrogen chloride from hydrogen gas by absorbing the former in water; and finally by electrolyzing aqueous solutions of hydrochloric acid, which is produced in the process, to recover and supply chlorine and hydrogen gases to the system for re-use.

The several steps in this process are sequentially shown in the following equations in which lead sulphide is taken as an example of one of the sulphides to be treated.

(1) $PbS + Cl_2 = PbCl_2 + S (+heat)$;

(2) $PbCl_2 + H_2$ (in excess) $+ heat = Pb + 2HCl + H_2$ (surplus).

Equation 1 shows the reaction involved in the chlorination step; Equation 2 represents the reaction taking place in the reduction step. The following equations illustrate the process steps for the recovery of the reagents.

(3) $(HCl + H_2)$ gaseous mixture $+ H_2O = HCl_{Aqua} + H_2$ gas;

(4) $HCl_{Aqua} = H_2 + Cl_2$ (by electrolysis).

To work my process the sulphide ore, concentrate, or the material which carry metallic sulphides is ground to the suitable degree of fineness and is chlorinated by chlorine gas, at elevated temperatures. The chlorination can be carried out in a suitable furnace of converter type, or in any other convenient type of furnace or compartment in which means are provided to bring about the necessary contact of the chlorine gas with the material to be chlorinated.

I find that when metallic sulphides are treated with chlorine gas, all the metallic sulphides are converted into the respective chlorides with liberation of heat; and that if the feed of chlorine and of the material to be chlorinated is regulated properly, practically all of the metallic chlorides formed can be volatilized by the heat evolved in the formation of the metallic chlorides. That is, if the material to be chlorinated is rich in metallic sulphides, all of the metallic sulphides will be decomposed by chlorine, and the heat developed by this reaction will suffice to volatilize practically the whole of the metallic chlorides produced. If the material to be chlorinated is poor in metallic sulphides, however, it will be necessary to supply some heat from an extraneous source to the chlorination-volatilization compartment.

In this process the chlorination and volatilization operations can be carried out continuously and in the same compartment of furnace. The material to be treated is fed into the chlorination-volatilization compartment or furnace and treated with chlorine gas. If the temperature of this reaction compartment is in the neighborhood of 900-1200 deg. C., or higher, all of the metallic chlorides are volatilized as soon as they are formed. The gangue is discharged from the chlorination-volatilization compartment by any suitable means as soon as it has accumulated.

The gangue minerals are not affected very appreciably by chlorine gas. Silica, and the oxides of calcium and magnesium are not converted into the respective chlorides by chlorine gas alone, even at temperatures as high as 1000-1200 deg. C. Therefore, I find that it is possible to separate all the valuable metals from the gangue by volatilizing the metals as chlorides simultaneously with the chlorination. The metals that can be volatilized and separated from the gangue are gold, silver, copper, lead, zinc, cadmium, iron, nickel, and other metals. Arsenic, bismuth, antimony also can be volatilized as chlorides. At high temperatures and in the presence of chlorine, the sulphur of the metallic sulphides will volatilize as elemental sulphur.

It will generally be unnecessary to use an excess of chlorine for the purpose of assuring a complete chlorination of the metallic sulphides; the chlorination will be almost complete without the presence of an excess of chlorine. However, if an excess of chlorine is used in the chlorination step, the surplus or the unusued amount of chlorine should be returned to the chlorination-volatilization compartment or furnace where it can be re-used.

The formation of sulphur monochloride ($S_2Cl_2$) by the interaction of sulphur and chlorine in the chlorination-volatilization compartment is prevented if the temperature of the said compartment is higher than 650 deg. C., which is generally the case, and if large excess of chlorine is not present. I find that above the temperature of 650 deg. C. sulphur monochloride is decomposed almost completely. Hence under these conditions all the sulphur of the metallic sulphides can be distilled off as elemental sulphur, together with the metallic chlorides. If, however, any sulphur monochloride is formed in the condensers, it can be returned to the chlorination compartment where it is completely decomposed by heat.

The volatilized metallic chlorides and the sulphur may be condensed together or separately in dust treaters in ordinary condensers, or they can be caught by means of any other convenient device. Although it is possible to bring about a partial separation of volatilized chlorides by condensing them selectively or fractionally, for large scale operation it is found to be more convenient to collect all the volatilized materials together. The sulphur and the chlorides of iron, arsenic, antimony, etc. can be separated from one another and from the rest of the metallic chlorides by standard methods of fractional distillation, or by other convenient methods. Under certain conditions it will be found convenient to separate from the metallic chlorides (those which are to be reduced by hydrogen) the sulphur and the chlorides of iron, arsenic, antimony, and other chlorides which boil at moderate temperatures and are in their liquid states at relatively low temperatures. This separation may simplify the subsequent operation of reducing the metallic chlorides by hydrogen.

In my process, the chlorides of gold, silver, copper, lead, nickel, tin, zinc, and the chlorides of many other metals are reduced by hydrogen, together or separately. I find that the chlorides of gold, silver, copper, lead, nickel, tin, zinc, and of many other metals can be reduced by hydrogen gas, at elevated temperatures; and that by this reduction the respective metals and gaseous hydrogen chloride are formed. The reaction between hydrogen and the metallic chlorides is, at high temperatures, almost spontaneous; it is not necessary to use any catalyst for the purpose of activating the hydrogen gas.

To reduce the metallic chlorides by hydrogen I can use any vessel or reducing compartment, in which the metallic chlorides can be heated in an atmosphere or in a current of hydrogen gas, and in which an efficient contact of the metallic chlorides to be reduced and the hydrogen gas is brought about. It is necessary to make this reducing compartment air-tight. To eliminate the danger resulting from the access of air or oxygen into the reducing compartment, it is advisable to work at a slightly positive pressure, so that in case of leakage the hydrogen will flow out rather than the air or oxygen flow into the reduction compartment. It will be advisable also to provide a series of traps between the reduction compartment and the main source of hydrogen.

For efficient and economical reduction by hydrogen of metallic chlorides, high temperatures and an excess of hydrogen should be used. I find that if one-half of the metallic chlorides that are to be reduced together by hydrogen is lead chloride, the reduction can be carried out rapidly at temperatures somewhat higher than 800 deg. C. The chlorides of gold, silver, copper, and of some other noble metals can be reduced by hydrogen at a much lower temperature.

The metals produced by the reduction by hydrogen of the respective chlorides can be tapped from the reduction compartment through a convenient opening. If the metallic chlorides be reduced by hydrogen separately, the resulting metal can be marketed as refined metal; but if the metallic chlorides are reduced together in one reduction compartment, the metals produced can be tapped together and then refined by a subsequent operation.

The gas coming out of the reduction compartment will contain some vapors of metallic chlorides (this will particularly be the case if the reduction is carried out at very high temperatures), hydrogen gas, and gaseous hydrogen chloride. If this gas mixture containing the metallic chloride vapors, hydrogen, and hydrogen chloride be passed through a suitable dust condenser, all the volatilized metallic chlorides and of the metals can be caught and returned to the reduction compartment. By this method the loss resulting from the volatilization can be eliminated.

The gaseous mixture of hydrogen and hydrogen chloride is then brought into contact with water. Practically all of the gaseous hydrogen chloride dissolves in water forming hydrochloric acid, and thus is separated from the hydrogen. This unused hydrogen is returned to the system and re-used. The hydrochloric acid solution produced is conveyed to electrolytic cells, where it is electrolyzed. By this electrolysis hydrogen and chlorine gases are obtained and both of these gases are returned to the system for re-use.

As has been described above, in my process it is necessary to have chlorine gas to convert the metallic sulphides into the respective chlorides, and hydrogen gas to reduce the metallic chlorides produced. These two gases are obtained from the electrolysis of hydrochloric acid solutions, which acid in turn is produced by the reduction of metallic chlorides by hydrogen. Thus my process is a true cyclic process, and the chlorine and hydrogen gases can be used over and over again. But if certain metallic chlorides are marketed directly as such, there will of course be a shortage of chlorine in the system. The metals that may be sold in a chloride form are zinc, iron, arsenic, antimony, bismuth, and a few others. The necessary amount of chlorine, however, can be easily supplied to the system by bleaching powder, or by any other convenient method. If necessary, the chloride of iron can be decomposed by steam, at high temperatures, or it can be hydrolyzed in solutions, and its chlorine recovered for re-use.

The advantages of my process over other processes are: (a) No roasting of the sulphide is required; (b) high percentage of extraction is obtained; (c) all the sulphur of the metallic sulphides is recovered as elemental sulphur; and (d) all of the valuable metals are extracted from the sulphides.

I claim:—

1. The process of extracting metals from metallic sulphides which consists in chlorinating the sulphides at suitable temperature thereby forming metallic chlorides, and reducing the chlorides thus formed with hydrogen at suitable temperature thereby freeing the metals.

2. The process of extracting metals from metallic sulphides, which consists in chlorinating the sulphides at a sufficiently high temperature to volatilize the resulting chlorides and reducing the volatilized chlorides, with hydrogen at a suitable temperature thereby freeing the metals.

3. A step in the process of extracting metals from metallic sulphides which comprises chlorinating the metallic sulphides, heating the metallic chlorides thus formed in an atmosphere of hydrogen and regulating the temperature of the hydrogen so that the metallic chlorides are reduced by the hydrogen gas.

AHARON BAGHDASAR BAGHDASARIAN.